United States Patent
Deiss

(10) Patent No.: US 9,938,109 B2
(45) Date of Patent: Apr. 10, 2018

(54) METHOD FOR THE PRODUCTION OF A SEALING TAPE ROLL

(71) Applicant: ISO-Chemie GmbH, Aalen (DE)

(72) Inventor: Martin Deiss, Abtsgmuend (DE)

(73) Assignee: Iso-Chemie GmbH (DE)

( * ) Notice: Subject to any disclaimer, the term of this patent is extended or adjusted under 35 U.S.C. 154(b) by 189 days.

(21) Appl. No.: 14/826,258

(22) Filed: Aug. 14, 2015

(65) Prior Publication Data

US 2016/0060068 A1    Mar. 3, 2016

(30) Foreign Application Priority Data

Aug. 26, 2014 (EP) .................................... 14182235

(51) Int. Cl.
| | |
|---|---|
| *B65H 35/02* | (2006.01) |
| *B65H 18/00* | (2006.01) |
| *E04B 1/68* | (2006.01) |
| *E06B 1/62* | (2006.01) |
| *B32B 37/06* | (2006.01) |
| *B32B 37/12* | (2006.01) |
| *F16J 15/02* | (2006.01) |

(52) U.S. Cl.
CPC ............. *B65H 35/02* (2013.01); *B32B 37/06* (2013.01); *B32B 37/12* (2013.01); *B65H 18/00* (2013.01); *E04B 1/6812* (2013.01); *E06B 1/62* (2013.01); *F16J 15/02* (2013.01); *B32B 2305/72* (2013.01); *E06B 2001/626* (2013.01)

(58) Field of Classification Search
None
See application file for complete search history.

(56) References Cited

U.S. PATENT DOCUMENTS

| | | | | | |
|---|---|---|---|---|---|
| 4,238,082 | A | * | 12/1980 | Lund ................... | B65H 18/106 |
| | | | | | 242/412.1 |
| 4,342,432 | A | * | 8/1982 | Lund et al. .......... | B21C 47/003 |
| | | | | | 242/412.2 |
| 4,401,716 | A | * | 8/1983 | Tschudin-Mahrer . | E01C 11/106 |
| | | | | | 428/317.3 |

(Continued)

FOREIGN PATENT DOCUMENTS

| | | | |
|---|---|---|---|
| DE | 20 2012 101990 U1 | 8/2013 | |
| EP | 2620565 A1 | 7/2013 | |
| FR | 2309768 A1 * | 11/1976 | ............... B32B 7/02 |

OTHER PUBLICATIONS

Machine translation of French Patent 2309768, date unknown.*

*Primary Examiner* — Jeffry H Aftergut
(74) *Attorney, Agent, or Firm* — Jansson Munger McKinley & Kirby Ltd.

(57) ABSTRACT

A method for producing a sealing tape roll of flexible, compressed foam with at least one barrier layer extending in a radial direction thereof, the at least one barrier layer arranged axially between two layers of foam, comprises assembling and bonding of at least one first foam strip, which is provided on at least one of its side surfaces with a film strip, an adhesive tape strip, or an adhesive liquid medium, to at least one second foam strip in such a way that a foam-barrier layer web is obtained, in which at least one barrier layer originating from the film strip, the adhesive tape strip, or the adhesive liquid medium is arranged between adjacent foam strips. The foam-barrier layer web is then wound up into a sealing tape roll.

21 Claims, 11 Drawing Sheets

(56) References Cited

U.S. PATENT DOCUMENTS

| | | | | |
|---|---|---|---|---|
| 4,486,990 | A | * | 12/1984 | Bauch .................... E06B 9/02 49/490.1 |
| 4,572,452 | A | * | 2/1986 | Driscoll ................ B65H 35/02 156/259 |
| 4,740,256 | A | * | 4/1988 | Vosberg ............... B29C 53/265 156/200 |
| 4,767,655 | A | * | 8/1988 | Tschudin-Mahrer ..... E04B 1/68 206/83.5 |
| 5,755,905 | A | * | 5/1998 | Sinn .................... B65H 18/103 156/184 |
| 2009/0246498 | A1 | * | 10/2009 | Deiss ...................... E04B 1/68 428/220 |
| 2013/0154201 | A1 | * | 6/2013 | Kethorn ................. F16J 15/02 277/630 |
| 2013/0187348 | A1 | | 7/2013 | Deiss |

* cited by examiner

METHOD FOR THE PRODUCTION OF A SEALING TAPE ROLL

CROSS REFERENCE TO RELATED APPLICATION

This application claims priority based on European patent application EP 14 182 235.3 filed Aug. 26, 2014. The entire disclosure and contents of this application are incorporated by reference into the present application.

FIELD

The present invention relates to a method for the production of a sealing tape roll.

BACKGROUND

Sealing tapes unwound from sealing tape rolls are usually used to seal the joints between, for example, a frame profile of a window or a door and the wall of a building to seal off the joints against drafts and driving rain. A film strip provided additionally on one side surface of the sealing tape, furthermore, increase the impermeability of the strip to water vapor; see, for example, U.S. Pat. No. 4,401,716, US 2010/0009118 A1 or US 2010/0003465 A1. Nevertheless, films which are attached externally to the sealing tape suffer from the disadvantage that they can be damaged during the transport or installation of the sealing tape.

A sealing tape roll is known from DE 196 41 415 A1, which comprises at least one barrier layer extending in the radial direction, which is arranged between two layers of the foam and thus in the interior of the sealing tape roll. As a result, the barrier layer is better protected from damage. The barrier layer consists of an adhesive or of a lamination material. To produce a sealing tape of this type, large two-dimensional barrier layers are formed on sheets of an open-pore foam material by lamination or the use of an adhesive. Several layers of foam sheets and barrier layers are stacked to form laminate blocks. These laminate blocks are cut at right angles to the large two-dimensional barrier layers to obtain plates. The plates are then wound up into wide rolls in such a way that the barrier layers and the foam material are arranged in a row in the axial direction on the circumference of the rolls. A wide roll of this type is then cut into disks between the individual barrier layers to obtain several sealing tape rolls. This method requires complicated work steps, and the length of the sealing tapes produced is limited by the limitation imposed by the laminate blocks, which must be small enough to be processed by machine.

SUMMARY

It is an object of the present invention to provide a method for the production of a sealing tape roll with an internal barrier layer extending in a radial direction thereof, which method is simple and reliable and by means of which it is also possible to produce very long sealing tape rolls.

According to an aspect of the invention, the method for the production of a sealing tape roll consisting of flexible, compressed foam with at least one barrier layer extending in the radial direction thereof, the barrier layer arranged axially between two layers of foam comprises the following steps. First, providing at least one first foam strip of flexible foam, which is provided on at least one of its side surfaces with at least one film strip, an adhesive tape strip, and/or an adhesive liquid medium. Next, providing at least one second foam strip of flexible foam and assembling the at least one first foam strip with the at least one second foam strip and bonding them together in such a way that a foam-barrier layer web is formed, in which at least one barrier layer originating from the film strip, the adhesive tape strip, and/or the adhesive liquid medium is arranged between adjacent foam strips. Finally, winding up the foam-barrier layer web into a sealing tape roll, or winding up the foam-barrier layer web into an intermediate roll and cutting the intermediate roll at one or more points in the axial direction thereof to produce a plurality of sealing strip rolls which are less wide than the intermediate roll or introducing at least one cut into the foam-barrier layer web in a longitudinal direction thereof to form foam-barrier layer strips and winding up the foam-barrier layer strips into individual sealing tape rolls.

In this way, it is possible to produce sealing tape rolls of flexible, compressed foam with at least one barrier layer extending in the radial direction and arranged axially between two layers of the foam in an especially economical manner and also in very long lengths. In addition, the barrier layer is protected by its position between two foam strips from external damage during transport and installation of the sealing tape. The properties of the sealing tape, furthermore, can be varied in an especially large number of different ways, because foam strips of any desired type can be combined with each other.

The step of providing the at least one first foam strip preferably comprises the following steps. First, providing a first foam web consisting of a flexible foam. Next, applying a film web, an adhesive tape web, and/or a layer of an adhesive liquid medium to at least the top surface or the bottom surface of the foam web to produce a laminated foam web. Finally, introducing at least one continuous cut into the laminated foam web in a longitudinal direction thereof to produce a plurality of first foam strips, each of which is provided on at least one of its side surfaces with at least one film strip, adhesive tape strip, and/or adhesive liquid medium. In this way, several first foam strips can be produced simultaneously and in automated fashion.

The step of providing the first foam web preferably comprises the following steps of providing a first roll of the wound-up first foam web and unwinding the first foam web from the first roll. In this way, the first foam web can be stored easily in little space prior to treatment and can be easily processed.

The provided first foam web is preferably not impregnated, and after the step of assembling the strips and bonding them together, the method comprises the following steps of saturating the foam-barrier layer web with an impregnating agent; and drying the impregnated foam-barrier layer web. The barrier layer adheres especially well to the foam in this case.

The introduction of the at least one continuous cut into the laminated foam web is preferably carried out by means of at least one knife or at least one saw. These are especially well adapted to the cutting of foam webs.

In another aspect of the invention, the method for the production of a sealing tape roll consisting of flexible, compressed foam with at least one barrier layer extending in the radial direction thereof, the at least one barrier layer arranged between two layers of foam, comprises the following steps in the order given. First, providing at least two foam strips of flexible foam. Second, assembling the at least two foam strips and simultaneously introducing a film strip, an adhesive tape strip, and/or an adhesive liquid medium into each intermediate space between two adjacent foam strips. Next, bonding all of the foam strips together in such a way that a foam-barrier layer web is obtained, in which at least one barrier layer originating from the film strip, the adhesive tape strip, and/or the adhesive liquid medium is arranged between adjacent foam strips. Finally, winding up the foam-barrier layer web into a sealing tape roll, or winding up the foam-barrier layer web into an intermediate roll and cutting the intermediate roll at one or more points in the axial direction thereof to produce a plurality of sealing tape rolls which are less wide than the intermediate roll; or introducing at least one cut into the foam-barrier layer web in a longitudinal direction thereof to form foam-barrier layer strips and winding up the foam-barrier layer strips into individual sealing tape rolls.

In this way, sealing tape rolls of flexible, compressed foam with at least one barrier layer extending in the radial direction arranged axially between two layers of the foam can be produced in an especially economical manner and also in very long lengths. In addition, the barrier layer is protected by its position between two foam strips from external damage during transport and installation of the sealing tape. The properties of the sealing tape, furthermore, can be varied in an especially large number of ways, because foam strips of any desired type can be combined with each other.

The step of providing the at least two foam strips preferably comprises the following steps. First, providing a roll of a wound-up foam web. Next, unwinding the foam web from the roll. Finally, introducing at least one continuous cut into the foam web in a longitudinal direction of the foam web to produce a plurality of foam strips. In this way, several foam strips can be produced simultaneously and in automated fashion.

The introduction of each film strip or adhesive tape strip into each intermediate space between two adjacent foam strips is preferably accomplished by unwinding the film strip or adhesive tape strip from a coil or roll and by guiding the film strip or adhesive tape strip as required. As a result, each film strip or adhesive tape strip of any desired length can be provided above, below, or next to the foam strip and nevertheless be effectively introduced into the intermediate space in the conveying direction of the foam strip.

The introduction of the liquid adhesive medium into each intermediate space is preferably accomplished by means of a nozzle.

The bonding of the foam strips preferably comprises the step of bonding each film strip to one or both foam strips adjacent to the film strip by lamination.

The bonding of all the foam strips together preferably comprises the step of curing the liquid adhesive medium.

The bonding of all the foam strips together preferably comprises the step of applying heat.

The bonding of the all foam strips together preferably comprises the step of pressing the foam strips against each other.

In the case of alternative (ii), the cutting of the intermediate roll is preferably done by means of saws.

An adhesive layer which is adhesive on both sides is preferably applied to all of the foam strips of the foam-barrier layer web, namely, to a surface which is perpendicular to the at least one barrier layer, wherein the adhesive layer is lined with a peel-off film on the side facing away from the foam strip. Thus the double-sided adhesive strip can be used to attach the sealing tape directly to a frame profile of the window.

BRIEF DESCRIPTION OF THE DRAWINGS

Additional features and advantages of the present invention can be derived from the following description, which refers to the drawings.

DETAILED DESCRIPTION

Figure 1:
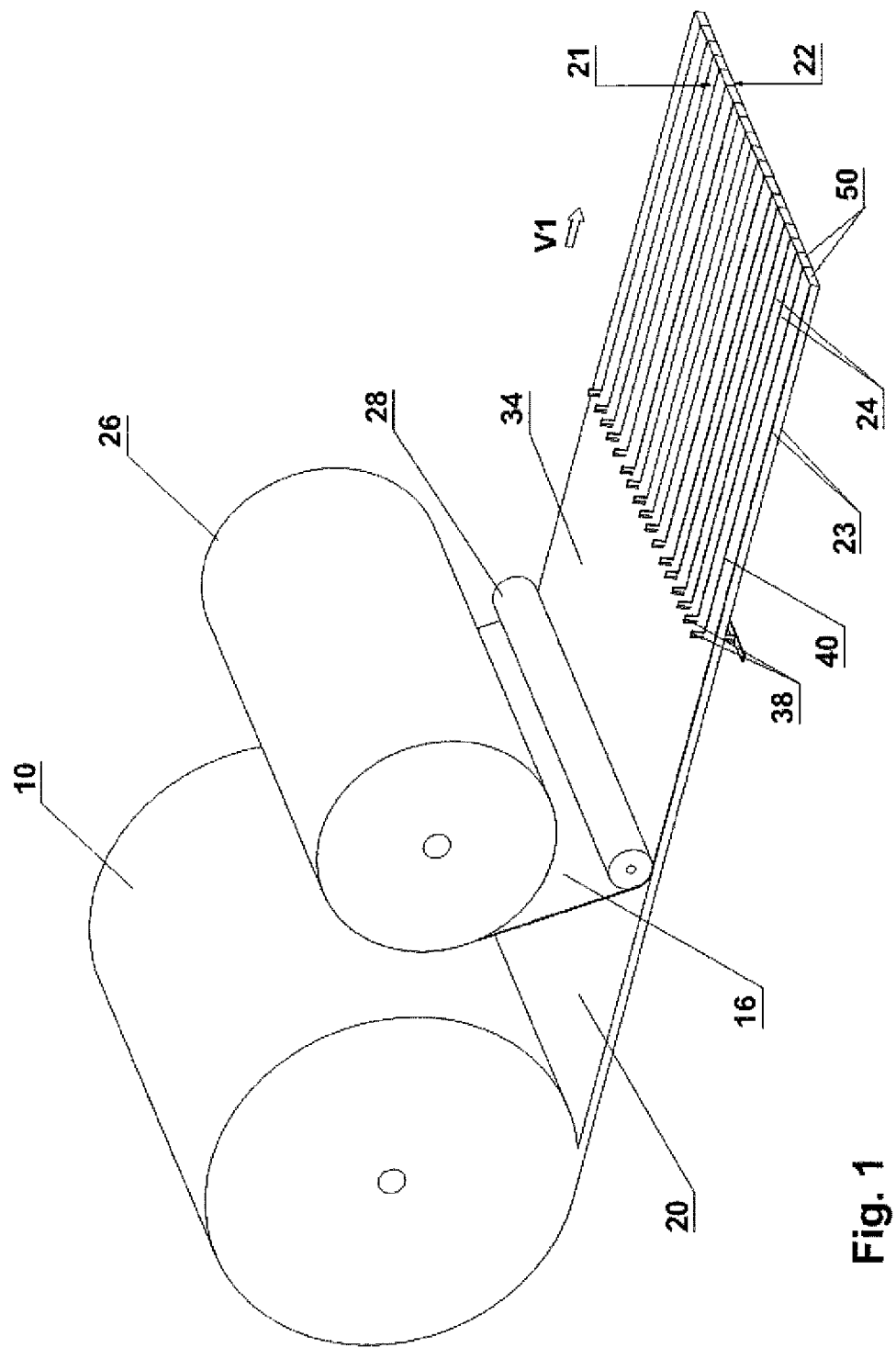
FIG. 1 shows a schematic perspective diagram of an example of the sequence of steps for producing first foam strips provided with a film strip as an optional part of a first embodiment of the method according to the invention for the production of a sealing tape roll.
Figure 2:
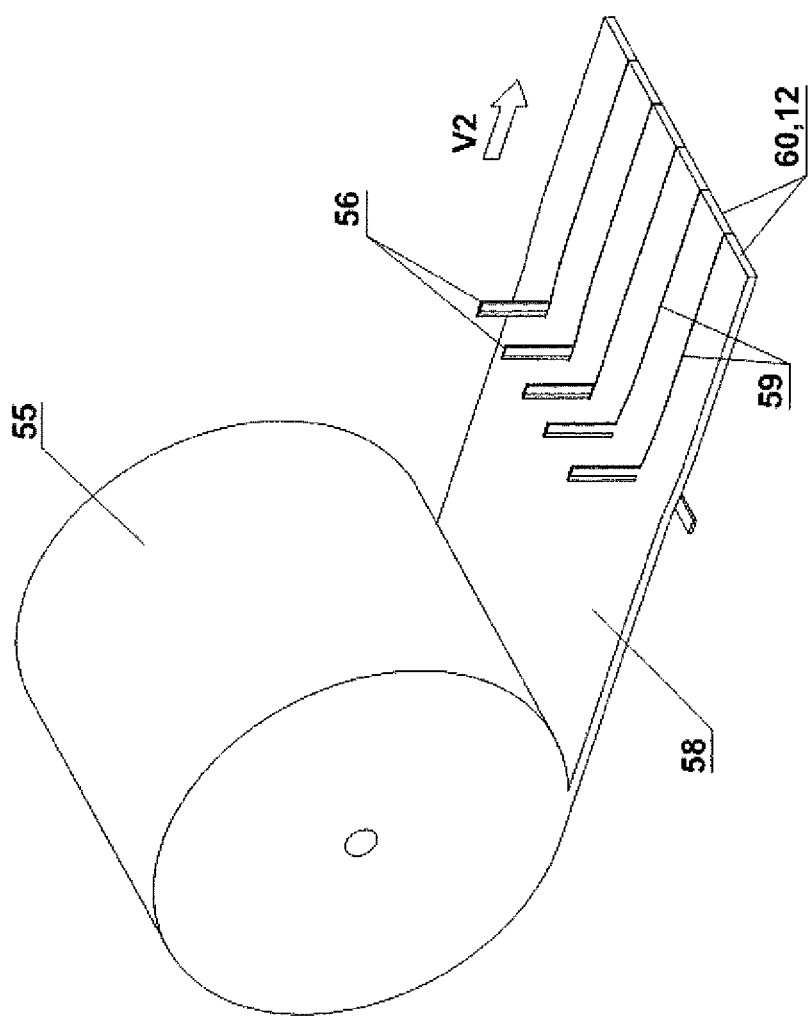
FIG. 2 shows a schematic perspective diagram of an example of the sequence of steps for producing second foam strips as an optional part of the first embodiment of the method according to the invention.
Figure 3:
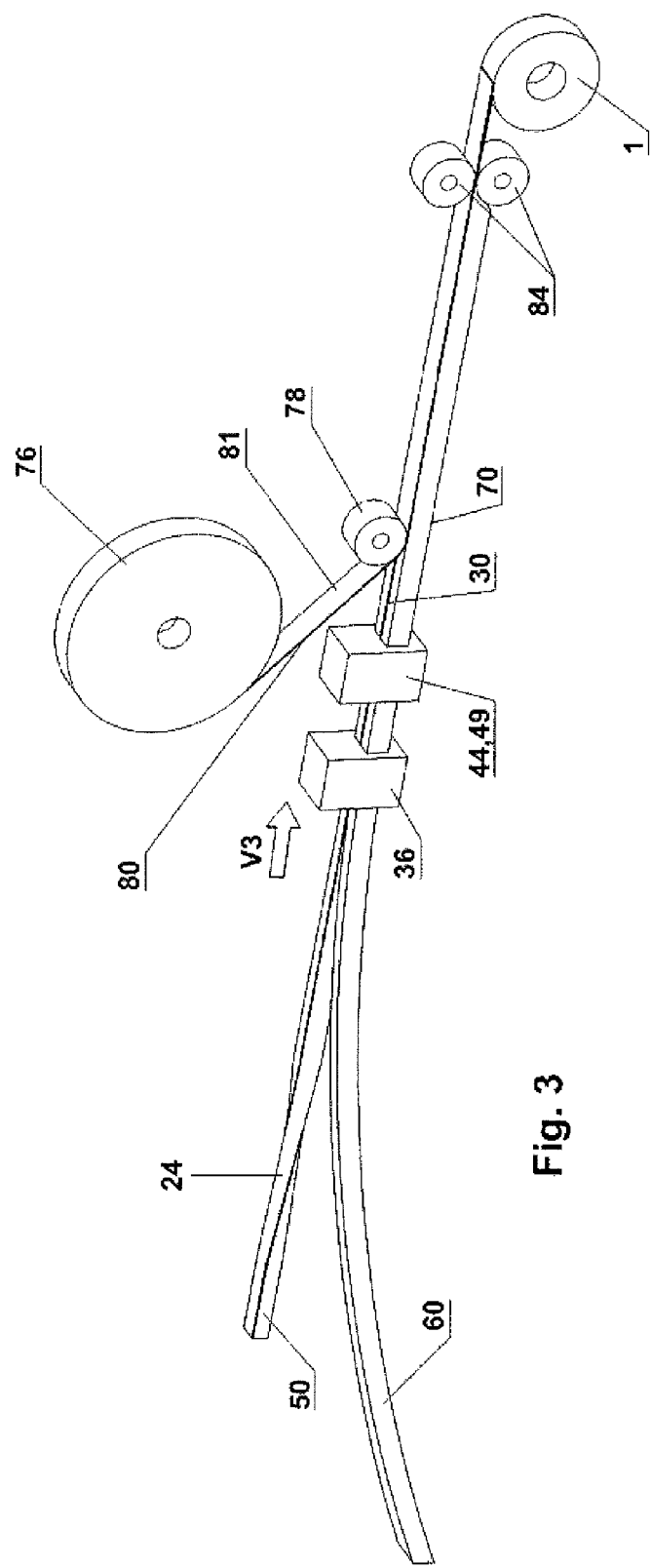
FIG. 3 shows a schematic perspective diagram of essential steps of a first embodiment of the method according to the invention for the production of a sealing tape roll.

FIGS. 1-3 show schematic diagrams of a first embodiment of the method according to the invention. In FIG. 1, first optional steps of the exemplary embodiment of the method according to the invention are illustrated. On a first roll 10, a flexible foam in the form of a wound-up foam web 20 is provided. The flexible foam is provided on a first roll 10 in long lengths of up to 200 meters, preferably of 5-100 meters, and more preferably of 10-60 meters. Any of the known open-cell, mixed-cell, or closed-cell flexible foams such as those made of polyurethane, polyethylene, polyvinyl chloride, or polypropylene can be used as the foam as long as they recover their original shape after compression. First foam web 20 can already have been impregnated prior to further processing, but preferably it is not impregnated.

Because of the way in which first roll 10 is provided, foam web 20 can be transported and processed especially easily. As a rule, foam web 20 on first roll 10 is in an uncompressed or only slightly compressed state. It is also possible for foam web 20 on first roll 10 to be in a compressed state, but then, after it has been unwound from first roll 10, it must be ensured that foam material will recover its original shape during the course of the process. The width of foam web 20 is usually in the range between 1 centimeters and 5 meters, and preferably in the range of 1.0-1.5 meters. The thickness of foam web 20 in the expanded state is usually in the range of 5-150 millimeters and more preferably in the range of 10-80 millimeters.

As an alternative, it would also be possible to provide individual first foam webs 20 which are not wound up on a first roll 10, as a result of which, however, a larger amount of space is needed to provide them.

After it has been unwound from first roll 10, first foam web 20 is moved in a first conveying direction, which is identified by the arrow V1. Then a film web 16 is applied to the top surface 21 of first foam web 20 to form a laminated foam web 34. In place of the film web 16 shown in Figure 1 or in addition to it, it is also possible to apply an adhesive tape web and/or a layer of an adhesive liquid medium to foam web 20.

In the embodiment shown in FIG. 1, film web 16 is provided on a film supply roll 26. Film web 16 and/or adhesive tape web and/or adhesive liquid medium is preferably applied from above to top surface 21 of foam web 20. This is usually done in the area of a first bonding unit, which is indicated schematically by the roller 28. The film web 16 or the adhesive tape web or the adhesive liquid medium should preferably adhere to the foam web but should not be laminated or dried onto it. In the case of a film web 16 or an adhesive tape web, the bonding step usually comprises in general a step of pressing the film web 16 or the adhesive tape web and the foam web 20 together. In the case of an adhesive medium, this is preferably applied by means of nozzles (e.g., a hot-melt nozzle, a flat nozzle, a mixing nozzle) or by roller application (transfer roller) to the foam web 20.

The adhesive tape web is usually provided with at least one peel-of film, which is removed from the adhesive tape before application to the foam web 20.

The film web 16 itself can also comprise a layer of adhesive tape or a layer of a hot-melt adhesive. It is also possible to apply a spray adhesive to the film web 16.

In alternative exemplary embodiments, the film web 16 and/or the adhesive tape web and/or the adhesive liquid medium can also be applied from below to the bottom surface 22 of the foam web 20. According to another exemplary embodiment, film webs 16 and/or adhesive tape webs and/or the adhesive liquid media are applied to the top surface 21 and to the bottom surface 22 of the foam web 20.

By means of at least one knife 38, and preferably several parallel knives 38, at least one continuous cut 40, and preferably several parallel cuts 40, are made into the laminated foam web 34 in the longitudinal direction of the laminated foam web 34, preferably parallel to the longitudinal edges 23 of the laminated foam web 34. The longitudinal edges 23 are the edges of the laminated foam web 34 which are parallel to the conveying direction V1 and at a right angle to the axial direction of the first roll 10. To introduce the at least one continuous cut 40 into the foam web 20, it is possible to use, instead of the knives 38, any of the other methods known to the person skilled in the art for cutting foam webs 20 such as cutting by means of saws, heated wires, laser cutting devices, or water jet cutting devices.

The continuous cuts 40 produce a plurality of first foam strips 50, which are provided with a film strip 24 and/or an adhesive tape strip and/or an adhesive liquid medium. The first foam strips 50 produced by means of the at least one cut 40 can have different widths, but preferably they are all of the same width. The width of a foam strip 50 is in the range between 5 mm and 30 cm, and preferably in the range of 1-12 cm. The first foam strips 50 can be at this point wound up into a supply roll (not shown), so that they can be sent elsewhere for further processing, thus shortening the overall length of the production line, or they can be sent directly to further processing. Overall, through the use of supply rolls for intermediate storage, the number of successive steps in a production line can be varied, and thus the length of the individual subsections of the production line can be adapted as appropriate to the amount of space available.

It is also conceivable that the first foam web 20 could be cut first into foam strips 50, and that the individual foam strips 50 would then be equipped with the film strips 24 and/or adhesive tape strips and/or the adhesive liquid medium. In this case, the film strips 24 and/or adhesive tape strips and/or the layer of the adhesive liquid medium can also extend over only a portion of a side surface of the foam strips 50. A film strip 24 can also be arranged on several side surfaces.

FIG. 2 shows an example of the optional sequence of steps in the production of second foam strips 60. For this purpose, a second foam web 58 of flexible foam is provided on a second roll 55, preferably uncompressed. After the web has been unwound from the second roll 55, the second foam web 58 is moved in a second conveying direction V2. With respect to the type of foam, the same as that said above for the foam of the first foam web 20 applies here as well.

By means of at least one knife 56, and preferably several parallel knives 56, at least one continuous cut 59, and preferably several parallel continuous cuts 59, are introduced into the second foam web 58 in a direction parallel to the longitudinal edges of the foam web 58. The at least one continuous cut 59 thus produces a plurality of second foam strips 60. Here, too, in place of the knives 56, any other type of method known to the person skilled in the art for cutting foam webs can also be used, such as cutting by saws, by heated wires, by laser cutting devices, or by water jet cutting devices. It is also possible here for the second foam web 58 to be provided in a form in which it has not been wound up into a second roll 55. The second foam strips 60 can at this point be wound up into a supply roll (not shown) or sent directly to further processing. Finally, the second foam strips 60 can also be provided individually. In addition, the second foam strips 60 can also be provided, like the first foam strips 50, with a film strip 24 and/or an adhesive tape strip and/or an adhesive liquid medium on at least one side surface.

FIG. 3 shows essential steps of the first exemplary embodiment of the production method according to the invention which can be carried out after the steps diagramed in FIG. 1 or FIG. 2. In principle, it is possible in all of the exemplary embodiments of the invention that the first foam strips 50 provided with at least one film strip 24 and/or adhesive tape strip are prefabricated at a different place, for example, or by a different manufacturer, and that they are used only in this finished form within the scope of the method according to the invention. The same also applies to the second foam strips 60.

In the exemplary embodiment shown in FIG. 3, a first foam strip 50 and a second foam strip 60 of flexible foam are assembled in such a way that a foam-barrier layer web 70 is obtained, in which a barrier layer 30 is arranged between adjacent foam strips 50, 60. The foam strip 50 is for this purpose preferably rotated 90° around its longitudinal axis by a turning device, wherein the longitudinal axis extends in a third conveying direction V3. As a result of this rotation, the film strip 24 and/or the adhesive tape strip and/or the layer of the adhesive liquid medium is then located on a side surface of the foam strip 50 facing the foam strip 60. At least by the time the two strips are brought together, the first foam strip 50 and the second foam strip 60 are transported jointly in conveying direction V3. It is also possible for several first foam strips 50 to be brought together with one or more second foam strips 60, or for several second foam strips 60 to be brought together with one or more first foam strips 50. The at least one first foam strip 50 can also be provided in such a way that no rotation of the first foam strip 50 is necessary. Similarly, the at least one second foam strip 60 can be provided in such a way that no rotation of the first foam strip 50 is necessary. The important point in all cases is that the side surface of the first foam strip 50 provided with a film strip 24 and/or an adhesive tape strip and/or an adhesive liquid medium is facing the adjacent foam strip 50, 60.

In addition to the assembly of the foam strips 50, 60, the step of bonding the foam strips 50, 60 together can require additional measures. For example, a bonding unit 36 can be provided, in which a step of applying heat and/or a step of pressing the foam strips 50, 60 together is carried out. A possible configuration of the bonding unit 36 is described in further detail below with reference to FIG. 5.

In all cases, when the foam strips 50, 60 are assembled and bonded together, a barrier layer 30 is formed out of the film strip 24 and/or the adhesive tape strip and/or the adhesive liquid medium.

Figure 6:
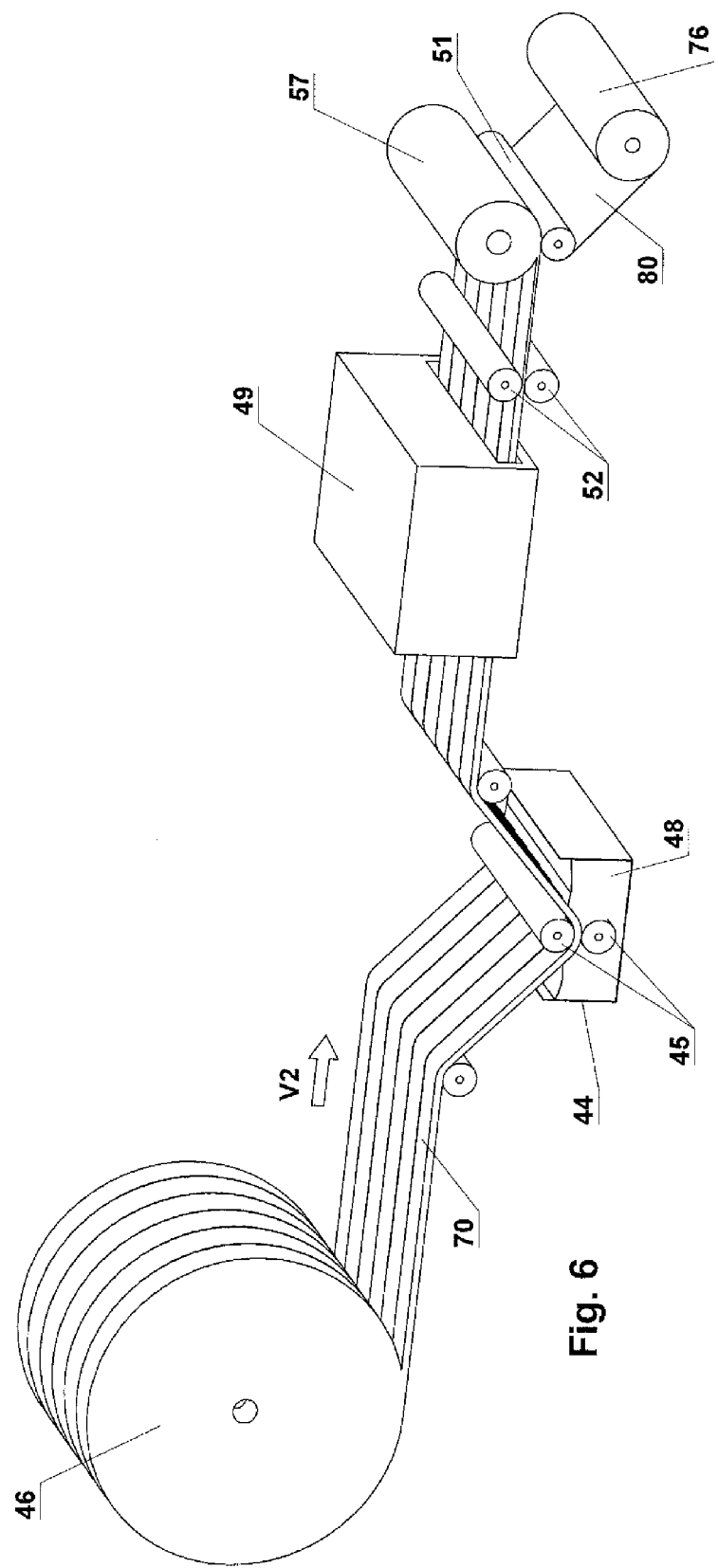
FIG. 6 shows a schematic perspective diagram of the sequence of steps according to the second exemplary embodiment of the method according to the invention of FIG. 4 in a second section of a device adapted to the method.

The foam-barrier layer web 70 can now be impregnated to delay its recovery, for example. For this purpose, an impregnation unit 44 followed by a drying unit 49 as described in greater detail below with reference to FIG. 6 is suitable. The impregnation can also take place at different points of the production process or even be omitted entirely.

After the step of assembling and bonding the at least one first foam strip 50 together with the at least one second foam strip 60 to obtain a foam-barrier layer web 70 and the optional impregnation, a common adhesive layer 80 is applied to all the foam strips 50, 60 of the foam-barrier layer web 70. The common adhesive layer 80 is applied to a surface of the foam-barrier layer web 70 which is perpendicular to the at least one barrier layer 30.

The adhesive layer 80 is preferably provided on a supply roll 76 and is applied in the area of an application station, here indicated schematically by the roller 78, to the foam-barrier layer web 70, and is preferably pressed firmly down or firmly rolled down. The use of double-sided adhesive tape as the adhesive layer 80 is especially suitable. This offers the advantage that it is easy to apply to the foam-barrier layer web 70 and, simultaneously, an adhesive surface is provided on the side facing away from the foam-barrier layer web 70, by means of which adhesive surface the sealing tape 2 can be attached to a frame profile of a window during the installation process. This second adhesive surface of the double-sided adhesive tape on the side facing away from the foam-barrier layer web 70 is first lined with a peel-off film 81 to prevent it from adhering to anything during further processing. The adhesive layer 80 can also contain textile fabric or nonwoven layers.

After the application of the common adhesive layer 80 to all of the foam strips 50, 60 of the foam-barrier layer web 70, the web is wound up under compression into a sealing tape roll 1.

One or more pairs of compression rollers 84, for example, can be used to achieve this compression. Alternatively or in addition, a compression roller (not shown) can cooperate with the sealing tape roll 1 right at the point where the sealing tape 2 is being wound up onto the sealing tape roll.

In all of the exemplary embodiments, it is also possible to apply two adhesive layers 80 to opposite sides of the foam-barrier layer web 70.

In an alternative exemplary embodiment, a foam-barrier layer web 70 consisting of a plurality of foam strips 50, 60 and barrier layers 30 is first given a common adhesive layer 80 and then wound up under compression into a wide roll (not shown), which can then be cut by means of at least one knife or at least one saw into sealing tape rolls 1 of the desired width, as will be described in greater detail below with reference to FIG. 7.

Depending on how the subsections of the production line are arranged, the conveying directions V1, V2, and V3 can be the same or different from each other.

FIGS. 4-7 show a second exemplary embodiment of the method according to the invention.

Figure 4:
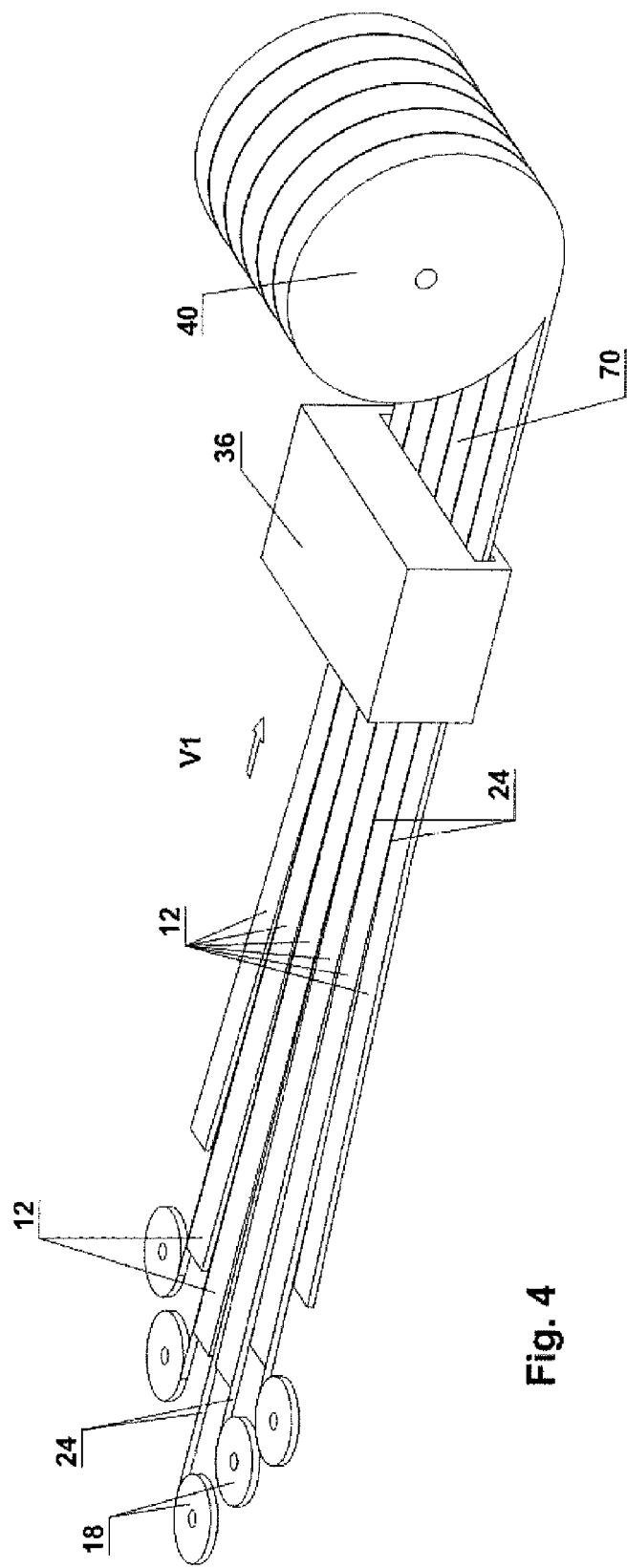
FIG. 4 shows a schematic perspective diagram of an example of the sequence of steps according to a second exemplary embodiment of the method according to the invention in a first section of a device adapted to the method.

Prior to the steps shown in FIG. 4, foam strips 12 are to be provided again. These foam strips 12 can be produced in the same way that the foam strips 60 are produced in FIG. 2. The foam strips 12 can comprise different widths, but preferably they are all of the same width. The width of a foam strip 12 is preferably in the range of 5-150 mm, and more preferably in the range of 10-80 mm.

A desired number of individual foam strips 12 are now brought together by suitable traction and guide elements. A film strip 24 or an adhesive tape strip is introduced into each intermediate space between two foam strips 12. Each film strip 24 or adhesive tape strip is for this purpose preferably provided on a coil 18 or a roll and is preferably introduced into the intermediate space by suitable guide elements. Each coil 18 can be arranged in any desired position relative to the foam strip 12, wherein each film strip 24 or adhesive tape strip will always be introduced essentially in the conveying direction V1 into the intended intermediate space. Deflecting elements such as deflecting shoulders or deflecting pulleys can be used here.

It is also conceivable that a film web or adhesive tape strip web (preferably in the form of a roll) could be provided and that this could be cut up into individual film strips 24 or adhesive tape strips before these strips are introduced into the intermediate spaces between the foam strips 12.

Adhesive tape strips are usually provided with at least one peel-off film, which is removed from the adhesive tape strip before insertion into the intermediate space.

It is also conceivable that each coil 18 could be arranged in such a way that the film strip 24 or the adhesive tape strip can be introduced into the corresponding intermediate space without deflection. It is also possible for the film strip 24 or the adhesive tape strip to be provided and introduced in any other suitable form, such as in the form of strips of predetermined length.

After each film strip 24 or adhesive tape strip has been introduced into the intermediate space between two adjacent foam strips 12, all of the film strips 24 or adhesive tape strips (preferably consisting of pressure-sensitive adhesive) are bonded to the two adjacent foam strips 12, preferably in the area of a bonding unit 36. The bonding step usually comprises, in general, a step of applying heat and/or a step of pressing the foam strips 12 together. In the case of film strips 24, the bonding to the foam strips 12 in the bonding unit 36 is preferably done by lamination. The film strips 24 themselves can also comprise one or more adhesive tape strips or a solid layer of a hot-melt adhesive.

Instead of the film strips 24 or adhesive tape strips, it is also possible to introduce an adhesive liquid medium into the intermediate spaces between the foam strips 12 by means of nozzles (hot-melt nozzles, flat nozzles, mixing nozzles) or by roller application (transfer roller).

Depending on the adhesive, it is then possible for the foam strips 12 to be bonded, preferably in the bonding unit 36, wherein the adhesive usually cures. In principle, any type of chemical or physical curing can be considered. Here, too, the bonding of the foam strips 12 will again usually comprises a step of applying heat and/or a step of pressing the foam strips 12 together. It is also possible to apply a spray adhesive to a film strip 24 like that shown in FIG. 4.

In principle, a foam-barrier layer web 70 is produced, which comprises at least one barrier layer 30, which originates from the film strip 24, the adhesive tape strip, and/or the adhesive liquid medium.

Figure 5:
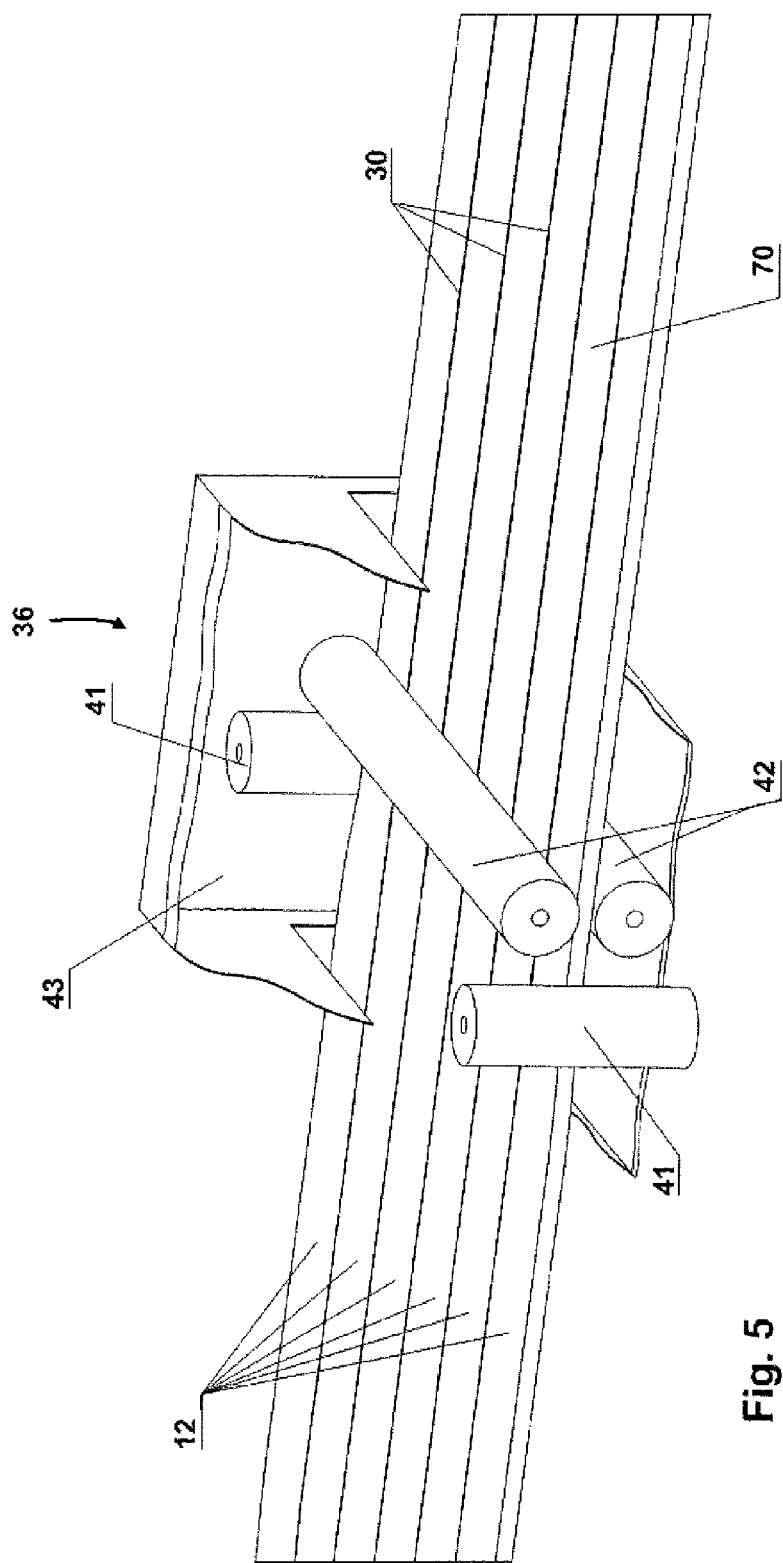
FIG. 5 shows a schematic perspective diagram of a detail of the bonding unit of FIG. 3 or FIG. 4.

FIG. 5 shows a view of a detail of a possible bonding unit 36. The bonding unit 36 preferably comprises a pair of pressing rollers 41, which are arranged on the two narrow sides of the foam-barrier layer web 70 and which press the individual foam strips 12 against each other. Each of the pressing rollers 41 is preferably rotatably supported around a vertical axis, wherein the two pressing rollers 41 rotate in opposite directions. A pair of traction rollers 42 is also preferably arranged in the bonding unit 36; these rollers extend across the width of the foam-barrier layer web 70 and form a gap through which the foam-barrier layer web 70 passes. The two traction rollers 42 are driven in opposite directions around a horizontal axis, and they thus pull the foam-barrier layer web 70 through the bonding unit 36. Such pairs of traction rollers 42 can also be used at other points of the production process. In the bonding unit 36, the traction rollers 42 could also be arranged upstream of the pressing rollers 41.

The bonding unit 36 preferably also comprises a heating device 43, which is merely suggested in FIG. 5. The heating device 43 can preferably comprise a housing, which surrounds the foam-barrier layer web 70. The heating device 43 can be configured to produce heat in any desired way. The heating device 43 can be used in combination with the pressing rolls 41. It is also possible to provide only the heating device 43 or only the pressing rolls 41 in the bonding unit 36. The heating device 43 can also be configured to bond only the upper and lower edge areas of the foam-barrier layer web 70 permanently together, in that the temperature and/or the heating time are adjusted accordingly.

The function of each barrier layer 30 is preferably to reduce or to prevent the passage of air and/or water vapor. This also applies to all of the other exemplary embodiments.

Downstream from the bonding unit 36, the foam-barrier layer web 70 can be wound up into a supply roll. It is also possible, however, for the foam-barrier layer web 70 to be sent continuously to the following processing steps. As a result, the number of steps occurring successively in the production line can be varied, and thus the length of the individual subsections of the production line can be adapted as appropriate to the amount of space available.

Figure 7:
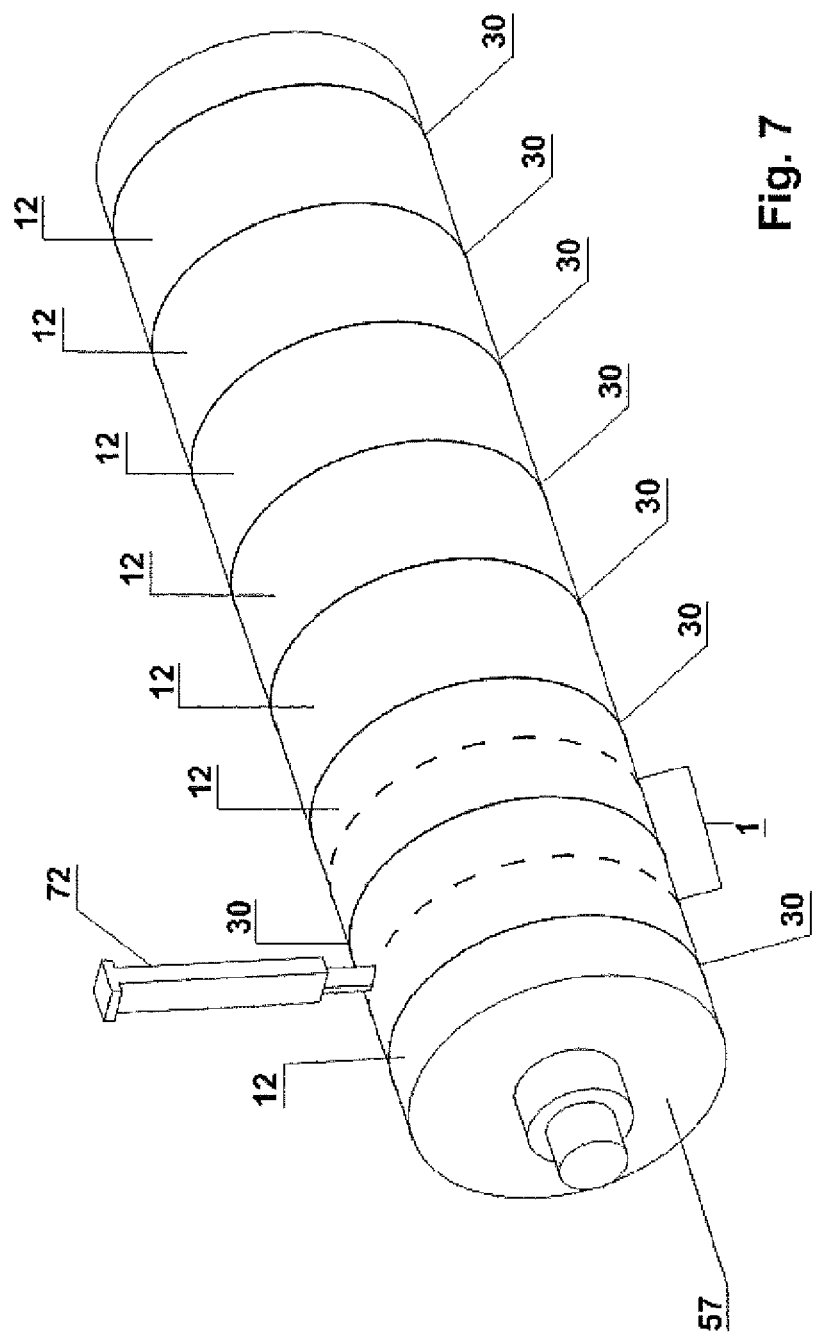
FIG. 7 shows a schematic perspective diagram of the step of cutting the intermediate roll according to an alternative form of the method according to the invention.

If the foam strips 12 have already been impregnated previously or if the sealing strip is to remain unimpregnated, the intermediate roll 57 of FIG. 7 or even the end product itself, i.e., the sealing tape roll 1, can be obtained right at this point.

If this is not the case, then the additional steps of the second exemplary embodiment of the method according to the invention are carried out as shown in FIG. 6. For this purpose, the foam-barrier layer web 70, previously wound up onto a supply roll 46, is first unwound again. In the exemplary embodiment shown in FIG. 6, the foam-barrier layer web 70 is guided in the next step through an impregnation unit 44 in a second conveying direction V2, which, depending on the subsections of the production line, can be the same or different from V1. Two rollers 45 guide the foam-barrier layer web 70 into a bath of a suitable impregnation agent 48, where the foam becomes completely saturated with the impregnation agent. Conventional impregnation agents and methods for impregnating foams are known to the person skilled in the art. The foam-barrier layer web 70 is preferably compressed between the rollers 45 so that the subsequent recovery of the foam supports the uptake of the impregnation agent 48. After the impregnation in the impregnation unit 44, the impregnated foam-barrier layer web 70 is dried in a drying unit 49. In this unit, the impregnated foam-barrier layer web 70 is dried by known means, e.g., by a hot-air blower or heat radiator. Then the foam-barrier layer web 70, preferably by the use of compression rollers 51, 52, is wound up into an intermediate roll 57. It can be sufficient to use only one compression roller 51 directly at the transition to the intermediate roll 57, or a pair of compression rollers 52 can be used beforehand to compress the foam-barrier layer web 70. In the example shown, both options are used in combination. The foam-barrier layer web 70 on the intermediate roll 57 is in a highly compressed state.

If no heating device 43 was used previously, the drying unit 49 following the impregnation unit 44 can, in a special embodiment, also function as a heating device for the permanent bonding of all the elements of the foam-barrier layer web 70 together. In this way, it would be possible to eliminate a heating step. This also applies to the embodiment according to FIG. 3.

In addition, an adhesive layer 80, such as, for example, a double-sided adhesive tape lined on both sides with peel-off film, is also applied to the foam-barrier layer web 70. The adhesive layer 80 is again stored on a supply roll 76 or supply coil and is pulled from it. The application of the adhesive layer 80 to the foam-barrier layer web 70 is preferably done simultaneously with the winding-up of the foam-barrier layer web 70 into the intermediate roll 57, wherein the compression roller 51 produces the pressure required to bond the adhesive layer 80 to the foam-barrier layer web 70.

The impregnation of the foam can also be carried out at other points of the production method. Similarly, the impregnation of the foam can be completely omitted, or it can already have been done before the foam strips 12 are provided. The impregnation of the foam preferably takes place, however, after the introduction of the film strips 24 or adhesive tape strips into the intermediate spaces between two adjacent foam strips 12, because each film strip 24 or adhesive tape strip adheres better to a foam which has not been impregnated and can therefore be bonded more effectively to it.

According to the variant of the second exemplary embodiment of the method according to the invention as illustrated in FIG. 7, the intermediate roll 57 is cut in the axial direction at one or more points to produce a plurality of sealing tape rolls 1, which are less wide than the intermediate roll 57. Preferably the cutting of the intermediate roll 57 is carried out by means of one or more parallel saws 72. Only one saw 72 is shown in FIG. 7, and an additional parallel cut for cutting the intermediate roll 57 is indicated in broken line. Here, too, other suitable methods for cutting the roll can be used (e.g., knives, heated wires, laser cutting devices, water-jet cutting devices).

The intermediate roll 57 is cut into sealing tape rolls 1 in such a way that foam strips 12 and the at least one barrier layer 30 alternate in the axial direction of the sealing tape roll 1. In a sealing tape roll 1, each radially-extending barrier layer 30 is accommodated between two foam strips 12, as a result of which the sealing tape 2 provides a more effective seal against drafts and/or the diffusion of water vapor, and each barrier layer 30 simultaneously is protected from external damage. For reasons of clarity, the preferably provided double-sided adhesive layer 80 lined with peel-off film is not shown here.

In the exemplary embodiment of FIG. 7, sealing tape rolls 1 with exactly one barrier layer 30 are produced. Sealing tape rolls 1 with multiple inner barrier layers 30 can also be produced. In this case, the barrier layers 30 of a sealing tape 2 can comprise different resistances to the diffusion of water vapor. For the formation of the barrier layers 30, furthermore, film strips 24 (or adhesive materials) can be used whose vapor diffusion resistance is adapted variably to the environmental conditions. The step of cutting the intermediate roll 57 into individual sealing tape rolls 1 can also be omitted if the entire intermediate roll 57 is already intended to be used as a sealing tape roll 1. In this case, it can nevertheless also be effective, for the sake of a smoother outer surface of the sealing tape roll 1, to cut off the edge areas of the intermediate roll 57. Otherwise, the sealing tape 1 is produced as shown by way of example on the right in FIG. 3.

Figure 8:
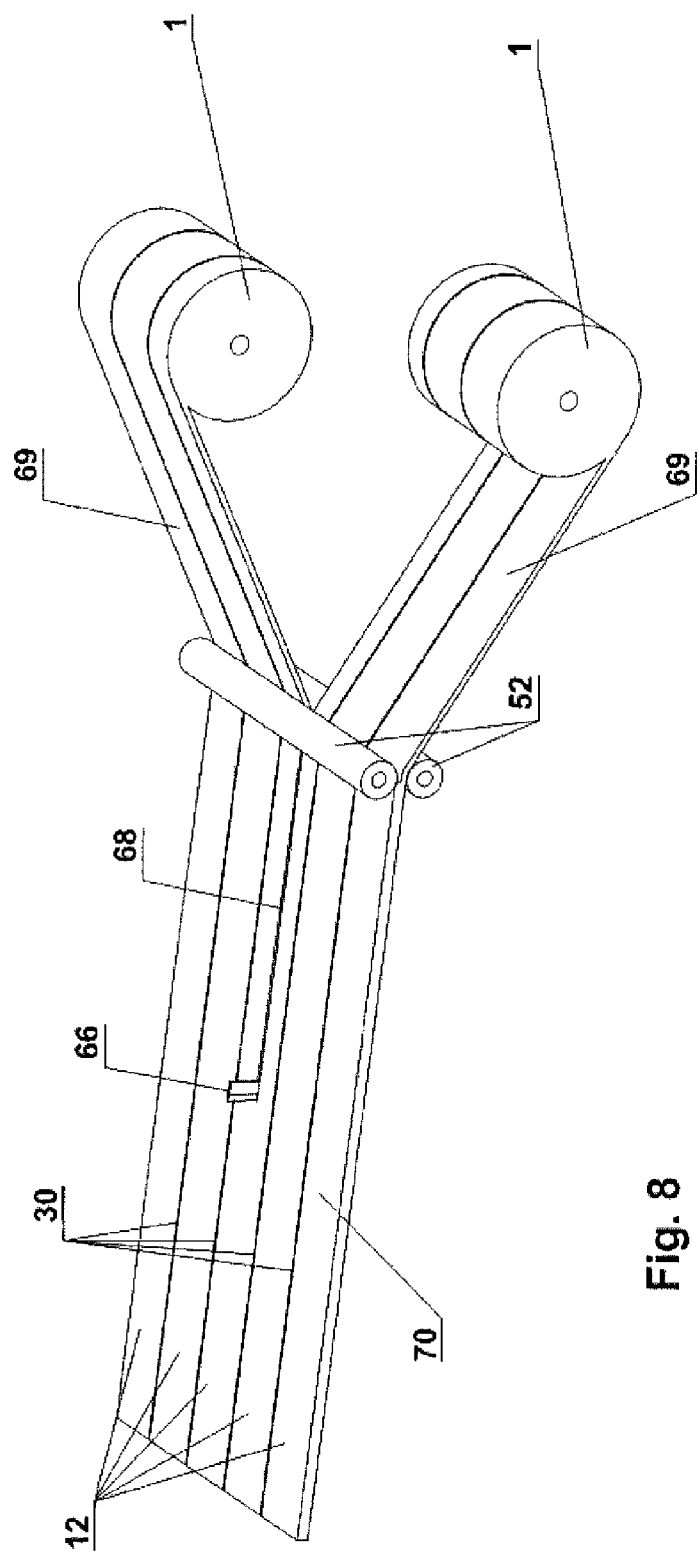
FIG. 8 shows a schematic perspective diagram of the final steps of an alternative exemplary embodiment of the method according to the invention.

FIG. 8 shows another alternative possibility for the final processing of the foam-barrier layer web 70 for the production of sealing tape rolls 1. In addition to the variant shown on the right in FIG. 6, the foam-barrier layer web 70 can also be cut in the longitudinal direction by one or several knives 66 or saws in the area of at least one foam strip 12. As a result, at least one cut 68 into the foam-barrier layer web 70 is made, as a result of which at least two foam-barrier layer strips 69 are produced. Each foam-barrier layer strip 69 can then be wound up into a finished sealing tape roll 1. Preferably, furthermore, a double-sided adhesive layer 80 provided with a peel-off film is also applied as in FIG. 6 (not shown in FIG. 8). In this way, the step of cutting an intermediate roll 57 into pieces as shown in FIG. 7 can be omitted. The compression rollers 52 can also preferably be used here to precompress the individual foam-barrier layer strips 69.

The two variants described in FIGS. 1-3 and in FIGS. 4-7 differ only in the production of the foam-barrier layer web 70. After that, all of the additional processing steps can be carried out in the identical way. Both exemplary embodiments make it possible to produce intermediate rolls 57 of considerable width, which are then cut into individual sealing tape rolls 1 (see FIG. 7). Narrow sealing tape rolls 1 can also be produced directly by either of the two exemplary embodiments, without the step of producing a wide intermediate roll 57 (see FIG. 3). The variant of FIG. 8 can also be carried out with either of the two exemplary embodiments.

In addition to the pulling forces caused by the downstream winding-up process, all of the foam webs, foam strips, foam-barrier layer webs, or foam-barrier layer strips are preferably carried forward by the action of rollers, especially preferably by pairs of counterrotating rollers.

Traveling belts can also be used. Such forward transport means can also be used for the film strips, film webs, adhesive tape strips, or adhesive tape strip webs.

The heating devices mentioned in the exemplary embodiments are usually configured as hot-air blowers. Radiant heat can also be considered, however, such as that produced by infrared heaters or microwave heaters.

Figure 9:
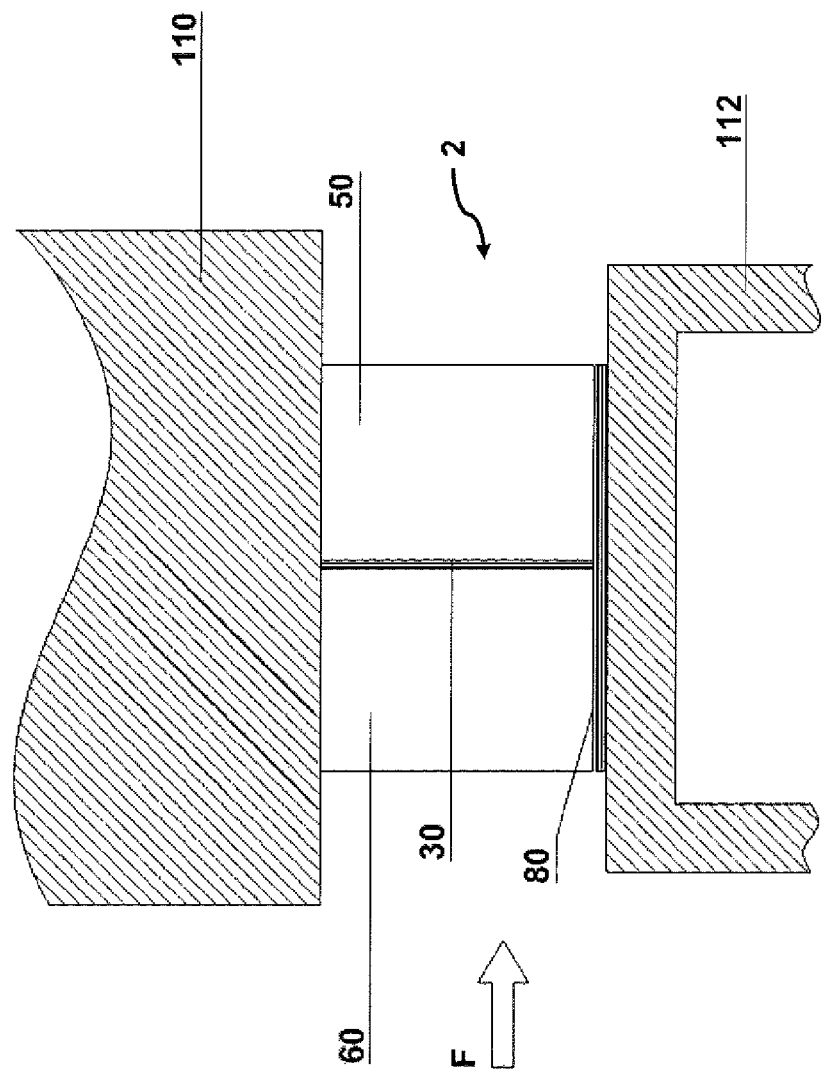
FIG. 9 shows a schematic, cross-sectional view of an installation situation of one embodiment of the sealing tape produced according to the invention.

FIG. 9 shows an installation situation of the sealing tape 2 unwound from a sealing tape roll 1 according to the invention. For installation, the sealing tape 2 must first be unwound from the sealing tape roll 1 and cut into strips of any desired length. The length of the sealing tape strip is usually adapted to the external contours of the window frame or door frame to be sealed. The sealing tape 2 is then attached to the window frame 112 or door frame preferably by means of the adhesive layer 80 or by means of other adhesive layers, adhesive tapes, or other suitable means. When a double-sided adhesive tape strip is used as the adhesive layer 80, therefore, only the peel-off film 81, with which the double-sided adhesive tape strip is lined on the side facing away from the foam strip 50, 60, must be removed before the sealing tape 2 can be attached directly to the window frame 112.

In the installation situation shown in FIG. 9, the sealing tape 2 is accommodated between a window frame 112 and a masonry wall 110 in order to seal off the joint in between.

The illustrated sealing tape 1 comprises, in this case, a first foam strip 50, which is provided with a barrier layer 30, and a second foam strip 60. For protection, the barrier layer 30 is accommodated between the two foam strips 50, 60, as a result of which it cannot be damaged during the storage, transport, or installation of the sealing tape roll 1 or sealing tape 2.

The sealing tape 2 is to be installed in such a way that at least one barrier layer 30 extends from the window frame 112 to the masonry wall 110 and thus essentially at a right angle to a functional direction F of the sealing tape 2. The functional direction F extends here parallel to the surfaces of the window frame 112 and of the masonry wall 110 forming the joint to be sealed and proceeds from the outside of the room (on the left in FIG. 9) to the inside of the room (on the right in FIG. 9). In this way, a reliable seal against drafts and vapor diffusion can be guaranteed.

For the further adaptation of the sealing properties of the sealing tape 2, the first foam strip 50 can be made of foam material different from that of the second foam strip 60. The first foam strip 50 and the second foam strip 60 can also be impregnated with different impregnation agents, or only the first foam strip 50 or only the second foam strip 60 is impregnated. In another exemplary embodiment, the first foam strip 50 can be of a different color than the second foam strip 60. As a result, it is possible to identify, for example, the proper orientation in which the sealing tape 2 is to be installed.

In principle, any desired number of barrier layers 30 can be present in the sealing tape 2. Various widths and/or thicknesses of the first foam strip 50 and/or different widths and/or thicknesses of the second foam strip 60 are also conceivable, even within the same sealing tape 2.

Within a sealing tape 2, the first foam strip or strips 50 can have a different width and/or thickness than the second foam strip or strips 60. The width of the sealing tape 2 is usually in the range between 5 mm and 20 cm, and preferably in the range of 1-12 cm. In the relaxed state, the sealing tape 2 usually has a thickness in the range between 5 mm and 30 cm, and preferably in the range of 1-12 cm.

In the exemplary embodiment shown in FIG. 9, exactly one first foam strip 50 cooperates with exactly one second foam strip 60 to form the foam-barrier layer web 70, which is wound up into the sealing tape roll 1. There are many other possible ways in which the sealing tape 2 according to the invention can be assembled.

Figure 10:
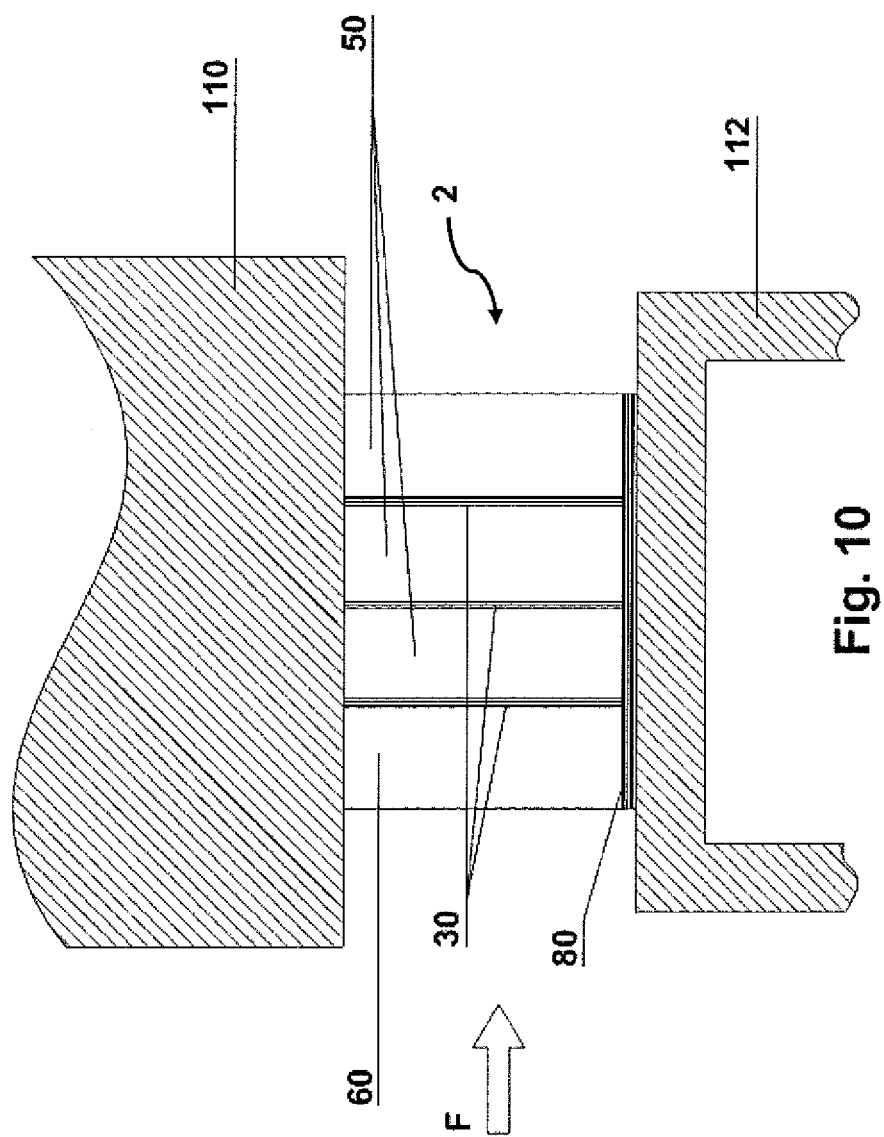
FIG. 10 shows a schematic cross-sectional view of an installation situation of another embodiment of the sealing tape produced according to the invention.

In another alternative exemplary embodiment, shown in FIG. 10, a plurality of first foam strips 50, here three first foam strips, are combined with exactly one second foam strip 60 to form the foam-barrier layer web 70, wherein exactly one barrier layer 30 is bonded to each first foam strip 50, and where the second foam strip 60 is arranged at one edge of the foam-barrier layer web 70. Here, too, the barrier layers 30 are arranged between adjacent foam strips 50, 60.

It is also possible for two barrier layers of two adjacent foam strips 50, 50 or 50, 60 to be arranged directly adjacent to each other.

In principle, it is possible in this way to configure foam-barrier layer webs 70 of any desired type, wherein foam strips 50, 60 and barrier layers 30 preferably alternate in functional direction F, and a foam strip 50, 60 is arranged on one edge of each foam-barrier layer web 70.

Figure 11:
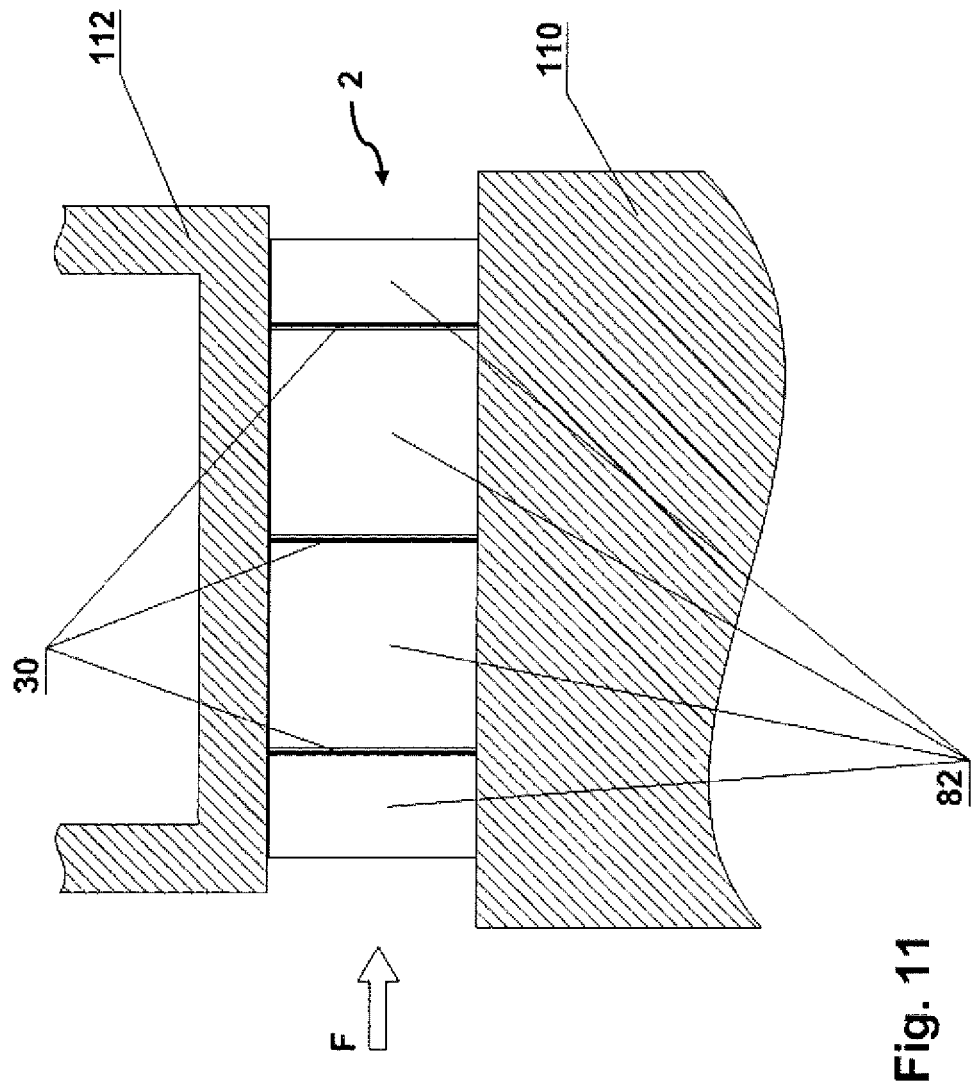
FIG. 11 shows a schematic, cross-sectional view of an installation situation of another embodiment of the sealing tape produced according to the invention.

The sealing tape 2 shown in FIG. 11 comprises in this case three barrier layers 30 between four foam strips 82, wherein the two outer foam strips 82 are only half as wide as the two inner foam layers 82.

All of the variants of the sealing tape 2 shown in FIGS. 9-11 can be produced by either of the two variants of the production method according to the invention as specified in claim 1 and claim 6. To this extent, the reference number 50, 60 in FIGS. 9 and 10 can stand simultaneously for all of the reference numbers 12. All of the previously described variants of the foam strips 50, 60 are candidates for the foam strips 12, and in particular different foam strips 12 can have different properties in the same sealing tape.

Within the scope of this application, a "barrier layer" 30 designates a layer which is adapted to reducing the passage of air or the diffusion of vapor through the sealing tape 2. A complete blockage of the passage of air or the diffusion of vapor is possible but not absolutely necessary. It can be advisable for at least one barrier layer 30 to be "moisture-variable", in such a way that, it is more resistant to diffusion at high humidities than at low humidities or vice versa.

With respect to the materials usable for the barrier layer 30, reference can be made to US 2013/0154201 A1 or to EP 2733271 A1, for example, the content of which is fully incorporated by reference in this application and is to be considered part of this application.

In addition to the properties of reducing or preventing vapor diffusion, it is especially important that each barrier layer 30 be permanently elastic, so that, even after storage of the sealing tape roll 1 in the compressed state, it continues to behave elastically during the recovery of the sealing tape 2 and at all times rests tightly against the sides of the joint after the sealing tape 2 has been installed in a joint.

The invention claimed is:

1. A method for producing a sealing tape roll of flexible compressed foam with at least one barrier layer extending in a radial direction of the sealing tape roll, the barrier layer arranged axially between two layers of foam, the method comprising:
   providing at least one first foam strip of flexible foam, which has on at least one of the side surfaces thereof at least one film strip, an adhesive tape strip, or an adhesive liquid medium to form one of the barrier layers;
   providing at least one second foam strip of flexible foam;
   assembling the at least one first foam strip with the at least one second foam strip and bonding the at least one first foam strip and the at least one second foam strip together in such a way that one of the barrier layers is arranged axially between adjacent ones of the at least one first and second foam strips; and
   winding up the foam-barrier layer web into an intermediate roll with the at least one barrier layer extending in a radial direction of the intermediate roll and cutting the intermediate roll at one or more points in an axial direction thereof to produce a plurality of sealing tape rolls with the at least one barrier layer extending in a radial direction of the sealing tape rolls, which are narrower than the intermediate roll.

2. The method of claim 1 wherein providing the at least one first foam strip comprises:
   providing a first foam web of flexible foam;
   applying a film strip, an adhesive tape strip or a layer of an adhesive liquid medium to at least a top surface or a bottom surface of the foam web to produce a laminated foam web; and
   introducing at least one continuous cut into the laminated foam web in a longitudinal direction thereof to produce a plurality of first foam strips, each of which is provided on at least one of the side surfaces thereof with at least one film strip, an adhesive tape strip or an adhesive liquid medium.

3. The method of claim 2 wherein providing the first foam web comprises providing a first roll consisting of a wound-up first foam web and unwinding the wound-up first foam web from the first roll.

4. The method of claim 2 wherein provided the first foam web is not impregnated, the method comprises the following steps after the step of assembling and bonding the foam strips:
   saturating the foam-barrier layer web with an impregnation agent; and
   drying the impregnated foam-barrier layer web.

5. The method of claim 2 wherein introducing the at least one continuous cut into the laminated foam web is carried out by means of at least one knife or at least one saw.

6. The method of claim 1 wherein bonding of the foam strips comprises the step of bonding each film strip to one or both of the foam strips adjacent to the film strip by means of lamination.

7. The method of claim 1 wherein bonding of all the foam strips together comprises the step of curing the adhesive liquid medium.

8. The method of claim 1 wherein bonding of all the foam strips together comprises the step of applying heat.

9. The method of claim 1 wherein bonding of all the foam strips together comprises the step of pressing the foam strips against each other.

10. The method of claim 1 wherein cutting of the intermediate roll is carried out by saws.

11. The method of claim 1 wherein a double-sided adhesive layer is applied to all the foam strips of the foam-barrier layer web on a surface which is perpendicular to the at least one barrier layer, wherein the adhesive layer is lined with a peel-off film on a side facing away from the foam strip.

12. A method for producing a sealing tape roll of flexible compressed foam with at least one barrier layer extending in a radial direction, each of the at least one barrier layers arranged axially between two layers of foam, the method comprising:
   providing at least two foam strips of flexible foam;
   assembling the at least two foam strips with an intermediate space between adjacent pairs thereof and simultaneously introducing a film strip, an adhesive tape strip, or an adhesive liquid medium to form a barrier layer in each of the intermediate spaces axially between the at least two adjacent foam strips;
   bonding all of the foam strips together in such a way that a foam-barrier layer web is obtained with one of the barrier layers arranged axially between adjacent foam strips; and
   winding up the foam-barrier layer web into an intermediate roll with the at least one barrier layer extending in a radial direction of the intermediate roll and cutting the intermediate roll at one or more points in an axial direction thereof to produce a plurality of sealing tape rolls with the at least one barrier layer extending in a radial direction of the sealing tape rolls, which are narrower than the intermediate roll.

13. The method of claim 12 wherein providing the at least two foam strips comprises:
   providing a roll consisting of a wound-up foam web;
   unwinding the foam web from the roll; and
   introducing at least one continuous cut into the foam web in a longitudinal direction thereof to produce a plurality of foam strips.

14. The method of claim 12 wherein introducing each film strip or adhesive tape strip into each intermediate space between two adjacent foam strips is carried out by unwinding the film strip or the adhesive tape strip from a coil or roll and by guiding the film strip or adhesive tape strip.

15. The method of claim 12 wherein introducing the adhesive liquid medium into each intermediate space is carried out by means of a nozzle.

16. The method of claim 12 wherein bonding the foam strips comprises the step of bonding each film strip to one or both of the adjacent foam strips by means of lamination.

17. The method of claim 12 wherein bonding all the foam strips together comprises the step of curing the adhesive liquid medium.

18. The method of claim 12 wherein bonding all the foam strips together comprises the step of applying heat.

19. The method of claim 12 wherein bonding all the foam strips together comprises the step of pressing the foam strips against each other.

20. The method of claim 12 wherein cutting of the intermediate roll is carried out by saws.

21. The method of claim 12 wherein a double-sided adhesive layer is applied to all the foam strips of the foam-barrier layer web on a surface which is perpendicular to the at least one barrier layer, wherein the adhesive layer is lined with a peel-off film on a side facing away from the foam strip.

* * * * *